US010748230B2

(12) United States Patent
Mycroft

(10) Patent No.: US 10,748,230 B2
(45) Date of Patent: Aug. 18, 2020

(54) DELIVERY OF FUEL TO VEHICLES

(71) Applicant: BOOSTER FUELS, INC., Seattle, WA (US)

(72) Inventor: Francis Herbert Mycroft, Seattle, WA (US)

(73) Assignee: Booster Fuels, Inc., San Mateo, CA (US)

( * ) Notice: Subject to any disclaimer, the term of this patent is extended or adjusted under 35 U.S.C. 154(b) by 184 days.

(21) Appl. No.: 15/563,469

(22) PCT Filed: Mar. 31, 2016

(86) PCT No.: PCT/US2016/025300
§ 371 (c)(1),
(2) Date: Sep. 29, 2017

(87) PCT Pub. No.: WO2016/161132
PCT Pub. Date: Oct. 6, 2016

(65) Prior Publication Data
US 2018/0075567 A1    Mar. 15, 2018

Related U.S. Application Data

(60) Provisional application No. 62/141,703, filed on Apr. 1, 2015.

(51) Int. Cl.
*B65B 1/04* (2006.01)
*G06Q 50/30* (2012.01)
(Continued)

(52) U.S. Cl.
CPC ........... *G06Q 50/30* (2013.01); *B67D 7/0401* (2013.01); *B67D 7/348* (2013.01); *G06Q 10/06* (2013.01);
(Continued)

(58) Field of Classification Search
CPC ................... G06Q 50/30; B67D 7/348; B67D 2007/0459; B60K 2015/0561; B60K 2015/0569; E05B 83/34
See application file for complete search history.

(56) References Cited

U.S. PATENT DOCUMENTS 5,906,406 A * 5/1999 Pajakowski ............ B60K 15/05
220/86.2
6,339,736 B1 * 1/2002 Moskowitz .......... G06Q 10/087
701/32.7
(Continued)

OTHER PUBLICATIONS

Mobile Onsite Fueling; SC Fuels [online]; Retrieved on Feb. 24, 2016 <https://web.archive.org/web/20160224094723/http://www.scfuels.com/services/fuel-delivery/mobile-onsite-fueling/>.
(Continued)

*Primary Examiner* — Reinaldo Sanchez-Medina
(74) *Attorney, Agent, or Firm* — Rutan & Tucker, LLP

(57) ABSTRACT

Systems and methods for mobile refueling by mobile fuel carriers of vehicles of approved users at approved mobile refueling locations. The system may include a server connected to a network and a database accessible by the server that includes approved refueling location information and approved user and user vehicle information, including vehicle identification fuel preference information. User computers communicate with the server via the network, the user computers sending refueling request information including user identification and vehicle location information to the server. The server sends refueling instructions to a fuel carrier computer having a user interface which allows updating of route information with real-time information pertaining to user requests and fuel carrier location data.

17 Claims, 5 Drawing Sheets

(51) Int. Cl.
  *G06Q 10/06* (2012.01)
  *B67D 7/04* (2010.01)
  *B67D 7/34* (2010.01)
  *G06Q 20/18* (2012.01)
(52) U.S. Cl.
  CPC ..... *G06Q 20/18* (2013.01); *B67D 2007/0419* (2013.01); *B67D 2007/0442* (2013.01); *B67D 2007/0459* (2013.01); *B67D 2007/0461* (2013.01); *B67D 2007/0469* (2013.01)

(56) References Cited

U.S. PATENT DOCUMENTS

| | | | |
|---|---|---|---|
| 7,478,747 B2 * | 1/2009 | Call | G06Q 10/00 235/375 |
| 7,905,535 B2 | 3/2011 | Zentner et al. | |
| 2006/0293849 A1 * | 12/2006 | Baldwin | G06F 16/00 701/469 |
| 2009/0005902 A1 * | 1/2009 | Megiddo | G06Q 10/08 700/236 |
| 2009/0315729 A1 * | 12/2009 | Inhoffer | B64F 1/28 340/632 |
| 2011/0025267 A1 * | 2/2011 | Kamen | B60L 8/003 320/109 |
| 2011/0172816 A1 | 7/2011 | Ezra | |
| 2013/0013183 A1 | 1/2013 | Surnilla et al. | |
| 2013/0099893 A1 | 4/2013 | Kulinets et al. | |
| 2013/0247882 A1 | 9/2013 | Espinoza | |
| 2013/0282500 A1 * | 10/2013 | Latorre | G06Q 20/20 705/17 |
| 2014/0129379 A1 | 5/2014 | Tryba | |
| 2014/0305545 A1 | 10/2014 | Butler, Jr. | |
| 2017/0326982 A1 * | 11/2017 | Williams | B60K 35/00 |

OTHER PUBLICATIONS

International Search Report and Written Opinion, dated Aug. 18, 2016, for International Application No. PCT/US2016/025300, 15 pages.

* cited by examiner

DELIVERY OF FUEL TO VEHICLES

BACKGROUND

Technical Field

The present disclosure generally relates to methods, systems, and devices for mobile refueling of one or more vehicles at one or more locations.

Description of the Related Art

Fuel is used by many vehicles to provide the energy required for operation of the vehicles. Typically, a vehicle includes a receptacle that holds a determined quantity or amount of fuel which is consumed as the vehicle operates. In the case of electric or hybrid vehicles, energy is often stored by one or more storage devices, such as one or more on-board batteries. Thus, periodically the vehicle must be refueled or recharged. Conventionally, a user of a vehicle must navigate the vehicle to a filling station, charging station, or other place that provides fuel when the vehicle is in need of refueling. Such effort may be inconvenient or costly for the user or may have other drawbacks.

BRIEF SUMMARY

A vehicle access control system may be summarized as including: a body coupleable to a vehicle; at least one wireless transponder coupled to the body; at least one nontransitory processor-readable medium that stores at least one of processor-readable data or processor-executable instructions; and at least one processor communicably coupled to the wireless transponder and the at least one nontransitory processor-readable medium, the at least one processor: receives signals from the wireless transponder; and controls access to a fuel inlet of the vehicle responsive to the received signals from the wireless transponder.

The vehicle access control system may further include a fuel inlet lock that selectively controls access to the fuel inlet, the fuel inlet lock communicatively coupled to the at least one processor, wherein the at least one processor may control operation of the fuel inlet lock to control access to the fuel inlet of the vehicle responsive to the received signals from the wireless transponder.

The fuel inlet lock may include a passive lock. The fuel inlet lock may include an active lock. The fuel inlet lock may selectively restrict movement of at least one of a fuel inlet door of the vehicle or a cap selectively coupleable to the fuel inlet of the vehicle. The at least one processor may: determine whether the received signals from the at least one wireless transponder include a wireless key; and control access to the fuel inlet of the vehicle responsive to the determination of whether the received signals from the at least one wireless transponder include a wireless key. The body may be positionable behind a fuel inlet door of the vehicle. The body may be removably attachable to a portion of the vehicle. The at least one processor may transmit a signal that provides at least one of an identification of the vehicle or an indication of a presence of the vehicle access control system. The at least one processor may control access to an engine compartment of the vehicle responsive to the received signals from the wireless transponder.

The vehicle access control system may further include an engine compartment lock that selectively provides access to the engine compartment, the engine compartment lock communicatively coupled to the at least one processor, wherein the at least one processor may control operation of the engine compartment lock to control access to an engine compartment of the vehicle responsive to the received signals from the wireless transponder.

The engine compartment lock may include a passive lock. The at least one processor may prevent inadvertent removal of access to the fuel inlet of the vehicle responsive to the received signals from the wireless transponder.

The vehicle access control system may further include a visual indicator coupleable to a fuel inlet door of the vehicle, the visual indicator signaling to a user a request for refueling.

The at least one wireless transponder may include an RFID transponder.

The vehicle access control system may further include a location determination system component communicatively coupled to the at least one processor, wherein the at least one processor may: receive location data from the location determination system component; and wirelessly transmit location data via the at least one wireless transponder.

A method of operation for a vehicle access control system may be summarized as one in which the vehicle access control system includes a body coupleable to a vehicle, at least one wireless transponder coupled to the body, at least one nontransitory processor-readable medium that stores at least one of processor-readable data or processor-executable instructions, and at least one processor communicably coupled to the wireless transponder and the at least one nontransitory processor-readable medium, the method including: receiving, by the at least one processor, signals from the wireless transponder; and controlling, by the at least one processor, access to a fuel inlet of the vehicle responsive to the received signals from the wireless transponder.

A fuel delivery system may be summarized as including: at least one nontransitory processor-readable medium that stores at least one of processor-readable data or processor-executable instructions; and at least one processor communicably coupled to the at least one nontransitory processor-readable medium and to at least one data communications channel, the at least one processor: determining a target vehicle is to be refueled; receiving location information for the target vehicle over the at least one data communications channel; and providing refueling instructions to a processor-based device associated with a fuel carrier vehicle, the refueling instructions include at least the received location information for the target vehicle.

The at least one processor may: receive a request for refueling from a processor-based device over the at least one data communications channel; and determine the target vehicle is to be refueled based at least in part on the received request for refueling. The at least one nontransitory processor-readable medium may store a transponder identifier for a transponder associated with the target vehicle, and the refueling instructions may include the transponder identifier. The at least one processor may send a notification to a processor-based device associated with a user of the target vehicle over the at least one data communications channel, the notification notifying the user to provide access to at least one of the fuel inlet or an engine compartment of the target vehicle. The processor-based device associated with the user of the target vehicle may include at least one of a mobile device of the user or a processor-based head unit of the target vehicle. The at least one processor may: receive at least one of location information or route information for the fuel carrier vehicle; and determine the target vehicle is to be refueled based at least in part on the received location information for the target vehicle and based at least in part on the at least one of location information or route information for the fuel carrier vehicle. The at least one processor may: receive refueling schedule information for the target vehicle; and determine the target vehicle is to be refueled based at least in part on the received refueling schedule information. The at least one processor may: project a need of the target vehicle for fuel; and determine the target vehicle is to be refueled based at least in part on the projected need of the target vehicle for fuel. The at least one processor may: detect a need of the target vehicle for fuel; and determine the target vehicle is to be refueled based at least in part on the detected need of the target vehicle for fuel. The at least one processor may: receive a fuel level signal from a processor-based device over the at least one data communications channel, the fuel level signal indicative of a current amount of fuel in a fuel storage of the target vehicle; and detect the need of the target vehicle for fuel based at least in part on the received fuel level signal. The at least one nontransitory processor-readable medium may store fuel type information for the target vehicle, the fuel type information indicative of at least one of a type or grade of fuel to be provided to the target vehicle, and the refueling instructions include the fuel type information. The at least one nontransitory processor-readable medium may store a transponder identifier for a transponder associated with the target vehicle, and the refueling instructions may include the transponder identifier. The at least one nontransitory processor-readable medium may store vehicle identifier information for the target vehicle, and the refueling instructions may include the vehicle identifier information. The vehicle identifier information may include one or more of a make, model, color, year, or license number for the target vehicle. The at least one nontransitory processor-readable medium may store fuel inlet location information, the fuel inlet location information indicative of a location of the fuel inlet on the target vehicle, and the refueling instructions may include the fuel inlet location information. The at least one processor may send a notification to a processor-based device associated with a user of the target vehicle over the at least one data communications channel, the notification notifying the user to provide access to at least one of the fuel inlet or an engine compartment of the target vehicle. The processor-based device associated with the user of the target vehicle may include at least one of a mobile device of the user or a processor-based head unit of the target vehicle. The at least one processor may: receive an indication that fuel has been delivered to the target vehicle; and send a message to at least one processor-based device over the data communications channel responsive to the received indication that fuel has been delivered to the target vehicle. The at least one processor may send the message to at least one of a processor-based device associated with a user of the target vehicle or a processor-based device associated with an interested third party. The interested third party may be an entity at least partially responsible for payment of services provided by the fuel delivery system. The message may include identification of at least one of a quantity of fuel delivered, a type of fuel delivered, one or more services provided, one or more services available to be subsequently provided, or a price. The at least one processor may send the message to a plurality of different entities over the data communications channel, each of the plurality of different entities may be at least one of responsible for payment of at least a portion of a service provided by the fuel delivery system or responsible for approval of a service provided by the fuel delivery system. The at least one processor may: determine a plurality of target vehicles are to be refueled; receive location information for each of the plurality of target vehicles over the at least one data communications channel; generate a route map based at least in part on the received location information; and provide the generated route map to the processor-based device associated with the fuel carrier vehicle. The at least one nontransitory processor-readable medium may store approved location information, the approved location information indicative of one or more physical locations at which the target vehicle is permitted to be refueled. The at least one processor may: first receive location information for the target vehicle over the at least one data communications channel that is derived from a first location determination technology; and second receive location information for the target vehicle over the at least one data communications channel that is derived from a second location determination technology, the second location determination technology different from the first location determination technology. The first location determination technology may include global positioning system technology and the second location determination technology may include RFID locating technology.

A method of operation for a fuel delivery system may be summarized as one in which the fuel delivery system includes at least one nontransitory processor-readable medium that stores at least one of processor-readable data or processor-executable instructions, and at least one processor communicably coupled to the at least one nontransitory processor-readable medium and to at least one data communications channel, the method includes: determining, by the at least one processor, a target vehicle is to be refueled; receiving, by the at least one processor, location information for the target vehicle over the at least one data communications channel; and providing, by the at least one processor, refueling instructions to a processor-based device associated with a fuel carrier vehicle, the refueling instructions include at least the received location information for the target vehicle.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations. In other instances, well-known mathematical and statistical methods for performing statistical analyses and other well-known mathematical operation have not been described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Figure 1:
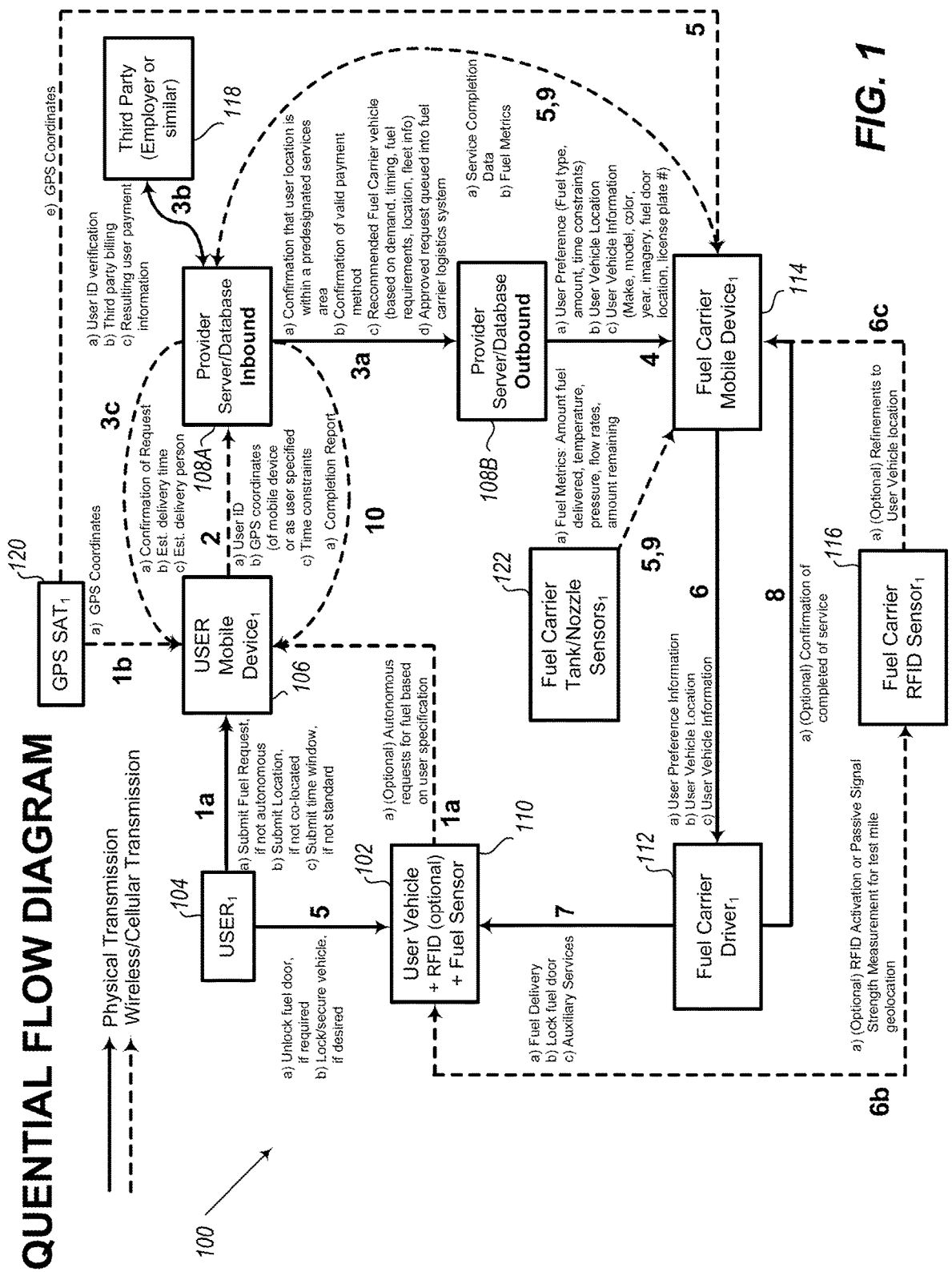
FIG. 1 is a functional flow diagram of a fuel delivery system for delivering fuel or other services to vehicles, according to one illustrated implementation.
Figure 2:
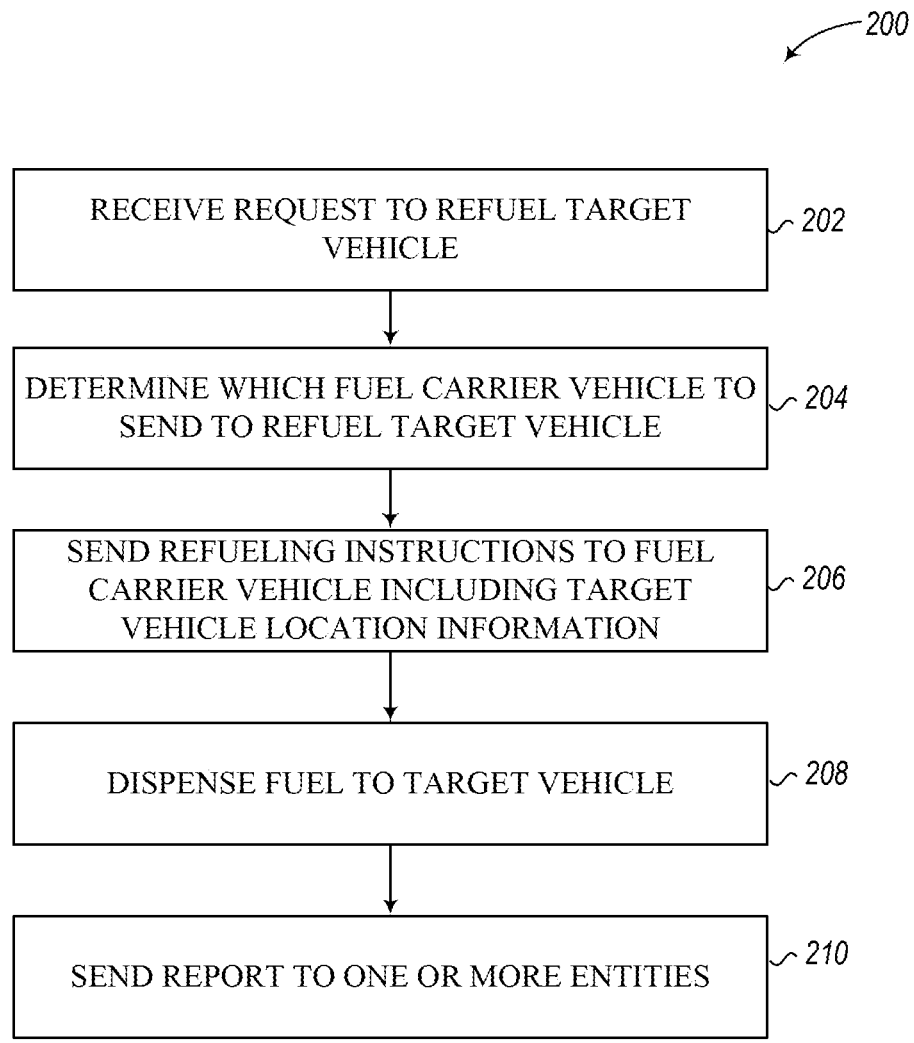
FIG. 2 is a flow diagram showing a method of operation of providing refueling services to a vehicle of a particular user, according to one illustrated implementation.

FIG. 1 shows a sequential flow diagram for a fuel delivery system 100 for refueling a user vehicle 102 associated with a user 104 having a user mobile device 106. FIG. 2 shows a corresponding high-level method 200 for operation of the fuel delivery system 100. The fuel delivery system 100 includes a mobile refueling service provider computer system 108A-108B (collectively "provider 108") that receives a request from an approved user 104 to refuel the vehicle 102 of the user at act 202 of method 200. The approved user 104 is one previously approved or authorized for receipt of the service by the provider 108. The user vehicle may be located in a previously approved or authorized physical location for provision of the service. The request includes user and/or user vehicle identification information and any user refueling preferences information. The preferences may also specify time limitations for the refueling to occur. The information may be obtained from the user mobile device 106 being operated by the user 104 in proximity to the vehicle 102 and which can automatically provide location information determined by positional data generated by positional tracking logic embedded in the mobile device 106. The mobile device 106 is optionally embedded in the vehicle 102 (e.g., in a head unit of the vehicle). Additionally or alternatively, the mobile device 106 is a cell phone or other handheld or portable personal wireless computing device of the user 104. Additionally or alternatively, when the user 104 is not co-located with the vehicle 102 at the time of the request, the user can optionally provide location information manually through a user interface. The mobile device 106, accordingly, need not be embedded in the vehicle 102. Additionally or alternatively, the request may be provided by other ways including, for example, by a personal computer or other computing device of the user 104 with access to a suitable data communications channel, such as the Internet. In some implementations, the request may be provided via a telephone call, or even provided manually (e.g., verbal, handwritten) by a user to personnel associated with the service.

The user and user vehicle information provided with the request can include, without limitation, one or more of (i) the name of the user (ii) an image of the user, (iii) an affiliation of the user, (iv) the user driver license number, (v) the image of the user vehicle, (vi) the vehicle license number, (viii) the vehicle description (e.g., color, make, model, version, year), (ix) the preferred product information, (x) payment information including payment card number, expiration date, zip code, and card security code.

The vehicle 102 to be refueled optionally bears an RFID tag 110 associated with the user 104 and/or the vehicle 102. The RFID tag 110 may have been pre-supplied by the provider 108 to the user 104. Alternatively, the user vehicle 102 may have a flag or other highly visible marker attached thereto to assist an operator 112 of a fuel carrier vehicle 122 in finding the vehicle 102. The provider 108 optionally can confirm receipt of the request or its acceptance or rejection to the user 104 via their mobile or other device 106. The acceptance may also provide an estimated time for the refueling and/or a quote for the service, and/or details of the operator 112 (e.g., name, photo, rating, etc.).

The provider 108 compiles the received request with existing earlier requests and/or future predicted requests from that local region in order to determine which fuel carrier vehicle to assign to that target vehicle at act 204 of the method 200. Thus, the provider 108 may efficiently allocate fuel carrier vehicles throughout a geographic region based on any number of factors, including earlier requests, future scheduled service requests, future predicted requests, fuel carrier vehicle fuel levels, traffic information, determined or predicted demand information, operator ratings, pricing, commissions or costs considerations, or other factors.

The provider 108 sends a fuel carrier operator 112 and/or the vehicle 122 to a site indicated by the location information via a mobile device 114 of the fuel carrier at act 206 of method 200. The mobile device 114 may be a mobile device associated with the operator 112 or may optionally be embedded in the fuel carrier vehicle 122 (e.g., in a head unit of the fuel carrier vehicle). At the site, the fuel carrier operator 112 can utilize a sensor 116 which optionally detects any RFID tag 110 in order to find the vehicle 102 to be refueled. The RFID tag 110 may be one which can be remotely activated by the operator 112 of the fuel carrier via the sensor 116 or via the mobile device 114 which is operatively coupled to the sensor 116.

In some implementations, the RFID tag system is a transponder/keyless entry system paired with the vehicle 102. In addition to or instead of unlocking doors or opening a truck, the RFID tag system may cause one or more lights on the vehicle to blink to signal to the operator 112 the identification or location of the vehicle.

After finding the vehicle 102, the fuel carrier 112 dispenses the fuel from the carrier vehicle 122 to the vehicle 102 to refuel the vehicle in accordance with any user preference information (e.g., type, grades, amounts of fuel, time for refueling, total cost constraints, auxiliary services) at act 208 of method 200. The fuel, without limitation, may be a gasoline, diesel fuel, natural gas, hydrogen, electricity, biofuel or similar energy storage solutions utilized by vehicles for locomotion. In some implementations, the fuel is mostly consumed in commuting to and from work and home.

Optionally, upon completion of the refueling, the fuel carrier 112 and/or provider 108 reports information regarding the completed task to the user 104 at act 210 of method 200. This information may also be reported directly to one or more third parties 118 for tax purposes, business operations purposes, or other purposes. The completion report may be wirelessly provided to the mobile device 106 of the user 104 and may include information on one or more of: the amounts and kinds of fuel provided, the total and per gallon cost of the fuel, the time of the refueling, the identity of the provider 108 and/or fuel carrier 112, any subsidy provided by a third party 118 (e.g., an employer), comparisons of this information to historical user data, comparisons to the cost of local retail gas providers, recommendations for future adjustments to behavior, promotional offerings, and personalized messages from the provider and/or fuel carrier.

The requests, replies and confirmations can be transmitted over a wireless or cellular network between the user's personal wireless or cellular device 106 and a provider's wireless or cellular device. For example, the requests and replies can be transmitted over a wireless or cellular network from the user's personal wireless device 106. The replies (e.g., confirmations, acceptances or refusals of a request, reports) can be transmitted over a wireless network to the user's personal wireless device 106. In some implementations, the location information is determined by positional data generated by positional tracking logic embedded in user's wireless device 106. In some implementations, the positional tracking logic is global positioning system ("GPS") logic and wherein the wireless device 106 received timing and positioning coordinates from one or more GPS satellites 120 and/or area augmentation systems (e.g., WAAS, LAAS). In some implementations, other location determination methods may be used, such as cell tower triangulation, crowd-sourced Wi-Fi data, or hybrid systems that use any combination of the above systems, for example.

The designated location may be a location which has been previously approved for refueling by the refueling service provider 108 and any party controlling use of the location to be approved. The location may be, without limitation, a commuter mass transit parking lot, a city street or a parking lot or driveway at the home, school, or place of employment of the user 104. The location can be, for instance, a parking lot at the place of residence or of employment of the user 104 (e.g., owner or operator) of the vehicle 102 to be refueled. The location may be one approved by a third party 118 who manages transaction efficiency, validates, bundles, categorizes users (e.g., officers, management, employees), pays part of the refueling costs, etc. Approved users 104 may be limited to individuals authorized for the refueling service by the employer or school or the third party 118 controlling the designated location.

The user vehicle 102 may be a personal vehicle used in commuting to and from the user's 104 workplace and home on the day the vehicle 102 is to be refueled. The user vehicle 102 can be, without limitation, an automobile, SUV, motorcycle, van, truck, watercraft, aircraft. Each vehicle to be refueled at a location may be independently owned and operated with respect to other vehicles to be refueled at the location. Accordingly, the vehicles can be individually owned or leased (e.g., not part of a co-owned fleet of vehicles). The owner/operator of the vehicle need not be present at the location or attending the vehicle at the time of refueling. No set, predetermined recurring service schedule need be established prior to commencement of the service.

The fuel is provided by a mobile refueling carrier (e.g., a fuel tanker) which is capable of transporting the fuel to the location and dispensing the fuel at the location. The carrier may transport different fuels in different tanks each with their own dispenser. In some implementations, the fuel carrier is a motor fuel (e.g., gasoline, diesel fuel, natural gas, a biofuel) carrier or a clean energy alternative (electric, hydrogen) carrier or a hybrid. As a non-limiting example, the carrier may have one or more fuel tanks independently capable of holding maximally from 20 to 4000 gallons of the fuel to be used in refueling vehicles. As indicated in FIG. 1, the fuel carrier 122 may include one or more fuel carrier tank/nozzle sensors which provide fuel metrics to the mobile device 114 of the fuel carrier operator 112 or to other devices associated with the user 104 or the service provider 108.

The user 104 may further specify the location of the vehicle 102 to be refueled and, optionally, the estimated duration of the vehicle's presence in that location. The user 104 may provide the provider 108 with access to the fuel port (e.g., unlocking the fuel door) of the vehicle 102 but otherwise could secure/lock the vehicle. The RFID tag 110 may be removably or permanently attached or affixed to the vehicle 102 to aid location determination by sensors 116 of the mobile fuel carrier vehicle 122 or the mobile device 114. The RFID tag 110 may be attached temporarily contemporaneously with communication of the request to serve to identify and locate the vehicle 102 to be refueled while implicitly confirming the request to be refueled. Additionally or alternatively, a flag or other visible marker can be attached to the vehicle 102 to facilitate the vehicle's location determination by the operator 112 of the fuel carrier 122. Additionally or alternatively, the GPS geolocation information provided over wireless or cellular network by the user mobile device 106 to the provider 108 may serve as sufficient position determination for the fuel carrier operator 112 of the fuel delivery service.

Where the designated location is a parking lot at or near a place of employment of the user 104, the location may have been specifically authorized by prior arrangement for this purpose by the employer and/or the parking lot operator. The employer of the user 104 may subsidize the cost of the refueling service for the approved user at the predesignated location. The subsidy (e.g., paid directly or indirectly to the user 104 or the mobile refueling service provider 108) may be wholly or partly based upon or in the form of a fixed fee or amount (e.g., gallons) per user or user vehicle; per time period (e.g., daily, weekly, monthly, yearly) per user vehicle, per fuel delivery, or per amount (e.g., gallons) delivered, or any combination of the above.

An autonomous refueling of the user's vehicle 102 (e.g., without the need for a specific request from an individual user) may also be employed. For instance, the user vehicle 102 can have a sensor (see sensor 412 of FIG. 4) that monitors fuel levels and reports the fuel levels to the mobile refueling provider 108, either directly or via the mobile device 106 of the user 104. The provider 108 may utilize such fuel level information to determine when the vehicle 102 requires refueling. The provider 108 may also project when the vehicle 102 needs refueling based on other information, such as previous driving patterns, projected driving patterns, user preferences, etc. The provider 108 may also recommend refueling based on fuel level of the vehicle and proximity of the vehicle to other vehicles that are already being serviced that day. In some instances, the provider 108 may offer incentives to users of such vehicles to be serviced early.

The user vehicle 102 may also have a GPS or other location device that reports the presence of the vehicle at designated location to the mobile refueling provider 108 and an automatic trigger or other control to open the fuel port for refueling. For example, the user 104 may have placed a standing order to refuel their vehicle when the vehicle is in need of fuel (e.g., less than ½, ⅓, ¼ full, or another specified amount) whenever their vehicle is parked at a designated location and has installed an automatic fuel port trigger or a fuel port control which can be operated from the mobile refueling vehicle operated by the fuel carrier operator 112.

In some implementations, the refueling service provider 108 may establish a service area or planned delivery route for the fuel carrier 122 (or numerous fuel carriers) based upon received past and/or current requests to refuel a vehicle from one or more preapproved users. These requests provide the user identification and user location information obtained from the mobile device 106 operated by the user 104 in proximity to the vehicle 102. If not already associated with the user 104, the user identification information optionally provides user vehicle identification information (e.g., make and model, year, color, license number, registration no.) and/or refuel preference information (e.g., gasoline, diesel, biofuel, or grade of fuel, amounts of fuel, time frame), and/or any employer and/or payment information to be associated with the user. As noted above, the user vehicle 102 also optionally bears an RFID tag 110 associated with the user 104. The user 104 may be associated with one or more vehicles. The user 104 may optionally select which vehicle to be refueled. Then, the provider 108 utilizes the pre-entered details (e.g., fuel type, vehicle type, location of fuel door) needed to perform the service. In some implementations, the provider 108 may send refueling instructions to a particular one of a plurality of fuel carriers based on one or more criteria, such as location, route, user rating, fuel type and quantity on board, etc.

In some implementations, the service areas or the planned delivery route may be adjusted to include site(s) as indicated by the location information. In some implementations, the receipt of the request may be confirmed by the recipient and/or the acceptance of the request may be communicated by the recipient to the user, or alternatively, a refusal of service be communicated to the user. The acceptance communication may provide information as to the likely delivery time. The refusal communication may provide an explanation or a counter offer of an alternative delivery location or time. Where a request is confirmed or accepted, the fuel carrier 122 travels to the site to find the user vehicle 102 which is optionally detected by the RFID tag 110 or similar last-mile geolocation system or other information provided with the request or associated with the preapproved records of the user 104. The fuel carrier 122 dispenses the requested fuel to the user vehicle 102 according to any given refueling preference information. In some implementations, the service area or planned delivery route includes designated locations where a vehicle may be refueled; and the location information corresponds to a designated location where a vehicle may be refueled.

The requests can be transmitted over a wireless or cellular network from the user's personal wireless or cellular device. In some implementations, the location information is determined by positional data generated by positional tracking logic embedded in the user's wireless or cellular device. In some implementations, the positional tracking logic is a geodesy system such as global positioning system ("GPS"), Galileo (European) or GLONASS (Russian) logic and wherein the wireless device receives timing and geodesy information from one or more satellites.

Implementations of the present disclosure also provide a nontransitory processor-readable medium tangibly embodying processor-executable instructions that cause a processor-based device to execute operations in support of a mobile vehicle refueling service as described above. For instance, the device may receive user refueling request information including user identification and user vehicle identification and location information from multiple users at different locations. Each location may be a preauthorized/predesignated refueling stop. The device may confirm receipt of the requests and/or or their acceptance or refusal of a request. The device may also determine at least one route for a fuel carrier to go to the different stops for accepted requests. The route may be based on the fuel and/or time efficiency of the route, navigation information concerning the accepted refueling stop locations, the total available product available on the vehicle, and the time available to complete the route. The determination of the route by the processing device may also include determining whether to accept or refuse a requestor location as a stop along the route to ensure a cost-efficient route. The logic may also ensure that the refueling vehicle retains enough supplies of fuel to meet the accepted requests, see that the refueling completed within the available time, and comply with any maximum time and/or distance metric per the received requests.

Implementations of the present disclosure also provide a system for mobile refueling by fuel carriers of vehicles of approved users at approved mobile refueling locations. The system includes a server connected to a network. This server has executable route engineering software and can access a database of approved refueling location information, approved user and user vehicle information, including optionally vehicle identification, fuel preference information, a database of public roads and, optionally, regulations regarding movement on public roads of the fuel carrier. The server communicates with a computer via the network. This computer sends refueling request information including user identification and vehicle location information to the server and a fuel carrier computer having a graphical user interface that allows updating of route information with real-time information pertaining to user requests and fuel carrier location data which includes a route start point. The route engineering software application accepts the route start point and, utilizing the updated user request information, calculates travel route options to the users locations. These routes optionally comply with relevant regulations. The route engineering software application may also compare the calculated travel route options to determine one or more suitable routes and provides these routes to the fuel carrier. These routes include at least one of: which of the calculated travel route options will result in the shortest overall travel time, which of the calculated travel route options will service the most users or deliver the most fuel within a time period, which of the calculated travel route options will result in the least total fuel usage by the fuel carrier, which of the calculated travel route options will result in the fewest traffic disruptions for the fuel carrier, and which of the calculated travel route options has the least number of traffic signals.

Implementations of the present disclosure also provide a mobile refueling service provider entity computer for providing and billing for mobile refueling services of user vehicles provided to authorized and/or approved users of the service at an authorized common location. This system provides a mobile refueling service provider entity computer which receives from a third party entity computer authorized user information including user personal vehicle identification, user identification, and user contact information for a plurality of users. The mobile refueling service provider entity computer also receives requests from a mobile device operated at the common location by an authorized user for service. The mobile device can have one or more processors that include, in the request for transport, information that identifies the customer of the customer device and, optionally, their location and other request information. The mobile refueling service provider entity computer confirms receipt of the request and instructs the service be provided according to the request. The mobile refueling service provider entity computer collects information on the utilization of the services for each user and/or vehicle and service, including the amount of fuel provided, location of refueling, and the service date. The mobile refueling service provider entity computer apportioning the cost to each user and the third party in accordance with the collected information and with agreements with the third party and each user, and, optionally billing the third party and each user according to the apportioned costs. In some implementations, the cost apportioned to the third party is a cost based upon any one or more of a fixed fee, the number of authorized or actual users over a billing period, the total amount of fuel provided and the number of refueling events over the period, or any combination thereof. Preferably, the mobile refueling service provider entity computer is used according to the methods according to the invention.

In some implementations, the third party entity is an employer or business partnership of the authorized user and the common service location is established in agreement with the third party. In further implementations, the common service location is at the employer's place of business, (e.g., a parking lot).

In other implementations, the service is provided to an unmanned or unattended personal vehicle of the user while the user is at work or otherwise away from the vehicle. In some implementations, the vehicle is used in commuting to and from work on the day it is refueled. In other implementations, the service may be provided in any situation when the user will not be driving the vehicle for a period of time, such as when the vehicle is parked at the user's residence, when the user is shopping, or when the vehicle is parked at the airport, a rental car drop off location, a country club, a hotel valet, a fitness center, and so on.

In other implementations, the invention provides a system for refueling a vehicle of an approved user at a predesignated location. The system may include means for an approved user at the predesignated location to send a request for the refueling, the request comprising GPS location and user identification information; means for a mobile refueling service provider to receive the request and confirm the identity and location of the user by use of a database of approved users and their predesignated locations; means for confirming and/or accepting the request; means for delivering the fuel to the location; RFID or similar means for finding the user vehicle at the location, for instance when GPS geopositioning is insufficient such as when the user vehicle is in a covered lot, including use of a database containing RFID values associated with the approved user; and means for dispensing the fuel to the user vehicle.

An example process for implementing the fuel delivery system 100 of FIG. 1 is now described. The user 104 drives the user vehicle 102 to an approved location (e.g., parking lot), such as the location of employment or similar recurring travel location (e.g., park and ride, retail locations, residential). The user 104 submits a request for refueling of the vehicle 102 via the mobile device 106 of the user to the service provider computing system 108. The mobile device 106 communicates with provider computing system 108, which evaluates fleet capacity, verifies payment information, and third party billing. The provider computing system 108 may determine vehicle selection, timing, pricing, and similar information.

The user 104 then receives at the mobile device 106 a confirmation of the request, delivery time, delivery driver, price, and other pertinent information, typically within seconds of making the initial request. The user 104 then unlocks the fuel door of the vehicle 102, locks the vehicle, and leaves the premises (e.g., leaves a parking lot to go into workplace). The fuel carrier 112 arrives at the user vehicle 102, delivers fuel, locks fuel door, and provides any additional services such as window washing, tire inflation, and basic maintenance before continuing in route to the next requestor of the service. As discussed further below, the fuel carrier operator 112 may also access other areas of the vehicle, such as the engine compartment, the passenger compartment, or the trunk, to perform additional services or tasks.

The user 104 receives a confirmation/receipt for the service via the user's mobile device 106. The user 104 then returns to the vehicle 102 when convenient for the user (e.g., after work).

Figure 3:
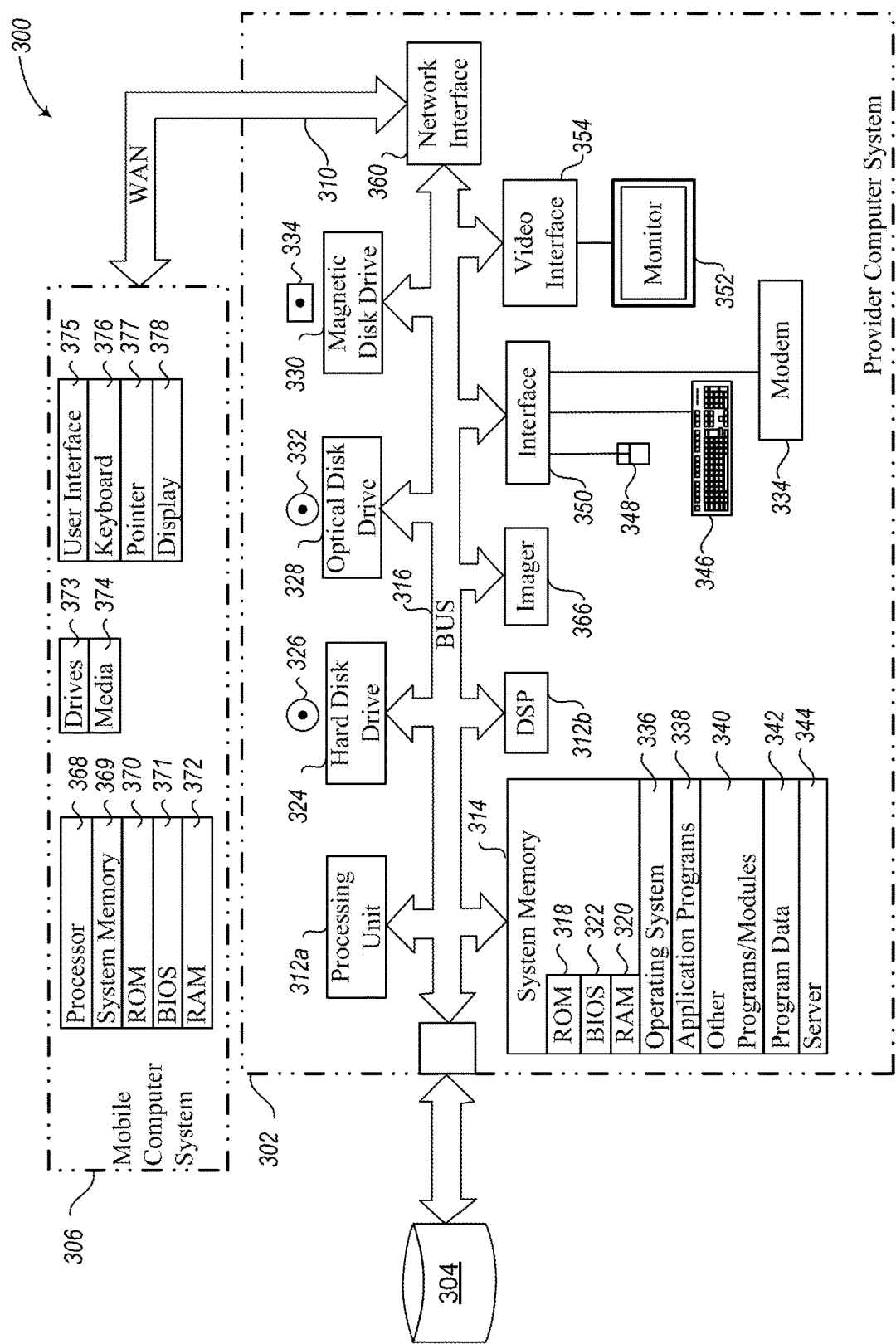
FIG. 3 is a functional block diagram of a fuel delivery system and mobile processor-based device, according to one illustrated implementation.

FIG. 3 shows a networked environment 300 comprising one or more service provider server computer systems 302 (only one illustrated) and one or more associated nontransitory computer- or processor-readable storage medium 304 (only one illustrated). The associated nontransitory computer- or processor-readable storage medium 304 is communicatively coupled to the service provider server computer system(s) 302 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The networked environment 300 also includes one or more mobile processor-based systems 306 (only one illustrated). For example, the mobile processor-based systems 306 may be representative of the user mobile device 106 or the fuel carrier mobile device 114 of FIG. 1. The processor-based systems 306 are communicatively coupled to the service provider server computer system(s) 302 by one or more communications channels, for example, one or more wide area networks (WANs) 310, for instance the Internet or Worldwide Web portion thereof.

In operation, the processor-based systems 306 typically function as a client to the service provider server computing system 302. In operation, the service provider server computer systems 302 typically functions as a server to receive requests or information from the processor-based systems 306.

The networked environment 300 may employ other computer systems and network equipment, for example, additional servers, proxy servers, firewalls, routers and/or bridges. The service provider server computer systems 302 will at times be referred to in the singular herein, but this is not intended to limit the implementations to a single device since in typical implementations there may be more than one service provider server computer systems 302 involved. Unless described otherwise, the construction and operation of the various blocks shown in FIG. 3 are of conventional design. As a result, such blocks need not be described in further detail herein, as they will be understood by those skilled in the relevant art.

The service provider server computer systems 302 may include one or more processing units 312a, 312b (collectively 312), a system memory 314 and a system bus 316 that couples various system components, including the system memory 314 to the processing units 312. The processing units 312 may be any logic processing unit, such as one or more central processing units (CPUs) 312a, digital signal processors (DSPs) 312b, application-specific integrated circuits (ASICs), field programmable gate arrays (FPGAs), etc. The system bus 316 can employ any known bus structures or architectures, including a memory bus with memory controller, a peripheral bus, and/or a local bus. The system memory 314 includes read-only memory ("ROM") 318 and random access memory ("RAM") 320. A basic input/output system ("BIOS") 322, which can form part of the ROM 318, contains basic routines that help transfer information between elements within the service provider server computer system(s) 302, such as during start-up.

The service provider server computer systems 302 may include a hard disk drive 324 for reading from and writing to a hard disk 326, an optical disk drive 328 for reading from and writing to removable optical disks 332, and/or a magnetic disk drive 330 for reading from and writing to magnetic disks 334. The optical disk 332 can be a CD-ROM, while the magnetic disk 334 can be a magnetic floppy disk or diskette. The hard disk drive 324, optical disk drive 328 and magnetic disk drive 330 may communicate with the processing unit 312 via the system bus 316. The hard disk drive 324, optical disk drive 328 and magnetic disk drive 330 may include interfaces or controllers (not shown) coupled between such drives and the system bus 316, as is known by those skilled in the relevant art. The drives 324, 328 and 330, and their associated computer-readable media 326, 332, 334, provide nonvolatile storage of computer-readable instructions, data structures, program modules and other data for the service provider server computer system 302. Although the depicted service provider server computer systems 302 is illustrated employing a hard disk 324, optical disk 328 and magnetic disk 330, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 314, such as an operating system 336, one or more application programs 338, other programs or modules 340 and program data 342. The system memory 314 may also include communications programs, for example, a server 344 that causes the service provider server computer system 302 to serve electronic information or files via the Internet, intranets, extranets, telecommunications networks, or other networks as described below. The server 344 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 3 as being stored in the system memory 314, the operating system 336, application programs 338, other programs/modules 340, program data 342 and server 344 can be stored on the hard disk 326 of the hard disk drive 324, the optical disk 332 of the optical disk drive 328 and/or the magnetic disk 334 of the magnetic disk drive 330.

An operator can enter commands and information into the service provider server computer system(s) 302 through input devices such as a touch screen or keyboard 346 and/or a pointing device such as a mouse 348, and/or via a graphical user interface. Other input devices can include a microphone, joystick, game pad, tablet, scanner, etc. These and other input devices are connected to one or more of the processing units 312 through an interface 350 such as a serial port interface that couples to the system bus 316, although other interfaces such as a parallel port, a game port or a wireless interface or a universal serial bus ("USB") can be used. A monitor 352 or other display device is coupled to the system bus 316 via a video interface 354, such as a video adapter. The service provider server computer system(s) 302 can include other output devices, such as speakers, printers, etc.

The service provider server computer systems 302 can operate in a networked environment 300 using logical connections to one or more remote computers and/or devices. For example, the service provider server computer systems 302 can operate in a networked environment 300 using logical connections to one or more processor-based systems 306. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the service provider server computer systems 302, the processor-based systems 306.

The processor-based systems 306 will typically take the form of end user processor-based devices, for instance, personal computers (e.g., desktop or laptop computers), net book computers, tablet computers, smart phones, personal digital assistants, vehicle head units, workstation computers and/or mainframe computers, and the like, executing appropriate instructions. These processor-based systems 306 may be communicatively coupled to one or more server computers. For instance, processor-based systems 306 may be communicatively coupled externally via one or more end user client entity server computers (not shown), which may implement a firewall. The server computers 302 may execute a set of server instructions to function as a server for a number of processor-based systems 306 (e.g., clients) communicatively coupled via a LAN at a facility or site, and thus act as intermediaries between the processor-based systems 306 and the service provider server computer system(s)

302. The processor-based systems 306 may execute a set of client instructions to function as a client of the server computer(s), which are communicatively coupled via a WAN.

The processor-based systems 306 may include one or more processing units 368, system memories 369 and a system bus (not shown) that couples various system components including the system memory 369 to the processing unit 368. The processor-based systems 306 will at times each be referred to in the singular herein, but this is not intended to limit the implementations to a single processor-based systems 306. In typical implementations, there may be more than one processor-based system 306 and there will likely be a large number of processor-based systems 306.

The processing unit 368 may be any logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, a Snapdragon processor from Qualcomm, an Exynos processor from Samsung, or an Ax processor from Apple. Unless described otherwise, the construction and operation of the various blocks of the processor-based systems 306 shown in FIG. 3 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 369 includes read-only memory ("ROM") 370 and random access memory ("RAM") 372. A basic input/output system ("BIOS") 371, which can form part of the ROM 370, contains basic routines that help transfer information between elements within the end user client computer systems 306, such as during start-up.

The processor-based systems 306 may also include one or more media drives 373, e.g., a hard disk drive, magnetic disk drive, WORM drive, and/or optical disk drive, for reading from and writing to computer-readable storage media 374, e.g., hard disk, optical disks, and/or magnetic disks. The nontransitory computer-readable storage media 374 may, for example, take the form of removable media. For example, hard disks may take the form of a Winchester drive, and optical disks can take the form of CD-ROMs, while magnetic disks can take the form of magnetic floppy disks or diskettes. The media drive(s) 373 communicate with the processing unit 368 via one or more system buses. The media drives 373 may include interfaces or controllers (not shown) coupled between such drives and the system bus, as is known by those skilled in the relevant art. The media drives 373, and their associated nontransitory computer-readable storage media 374, provide nonvolatile storage of computer readable instructions, data structures, program modules and other data for the processor-based systems 306. Although described as employing computer-readable storage media 374 such as hard disks, optical disks and magnetic disks, those skilled in the relevant art will appreciate that processor-based systems 306 may employ other types of nontransitory computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital files or data or metadata related to such can be stored in the nontransitory computer-readable storage media 374.

Program modules, such as an operating system, one or more application programs, other programs or modules and program data, can be stored in the system memory 369. Program modules may include instructions for accessing a Website, extranet site or other site or services (e.g., Web services) and associated WebPages, other pages, screens or services hosted by the service provider server computer system 114.

In particular, the system memory 369 may include communications programs that permit the processor-based systems 306 to exchange electronic or digital information or files or data or metadata with the service provider server computer system 302. The communications programs may, for example, be a Web client or browser that permits the processor-based systems 306 to access and exchange information, files, data and/or metadata with sources such as Web sites of the Internet, corporate intranets, extranets, or other networks. Such may require that the processor-based systems 306 have sufficient right, permission, privilege or authority for accessing a given Website, for example, one hosted by the service provider sever computer system(s) 302. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 369, the operating system, application programs, other programs/modules, program data and/or browser can be stored on the computer-readable storage media 374 of the media drive(s) 373. An operator can enter commands and information into the processor-based systems 306 via a user interface 375 through input devices such as a touch screen or keyboard 376 and/or a pointing device 377 such as a mouse. Other input devices can include a microphone, joystick, game pad, tablet, imager, scanner, etc. These and other input devices are connected to the processing unit 368 through an interface such as a serial port interface that couples to the system bus, although other interfaces such as a parallel port, a game port or a wireless interface or a universal serial bus ("USB") can be used. A display or monitor 378 may be coupled to the system bus via a video interface, such as a video adapter. The processor-based systems 306 can include other output devices, such as speakers, printers, etc.

Implementations of the present disclosure include an RFID tag embedded within in a vehicle control access system that can serve one or more of several purposes, where the opening or closing of the fuel port/door is controlled by a key or code, or keeps the fuel door from being inadvertently closed or closed due to inclement weather, and/or prevents access to the fuel door by unauthorized parties. The vehicle control access system may also visually mark and/or electronically identify that a fuel door is intentionally left ajar for the specific purpose of refueling. The RFID tag may be embedded in a device which regulates the opening and closing of a fuel port on the vehicle to be refueled.

Figure 4:
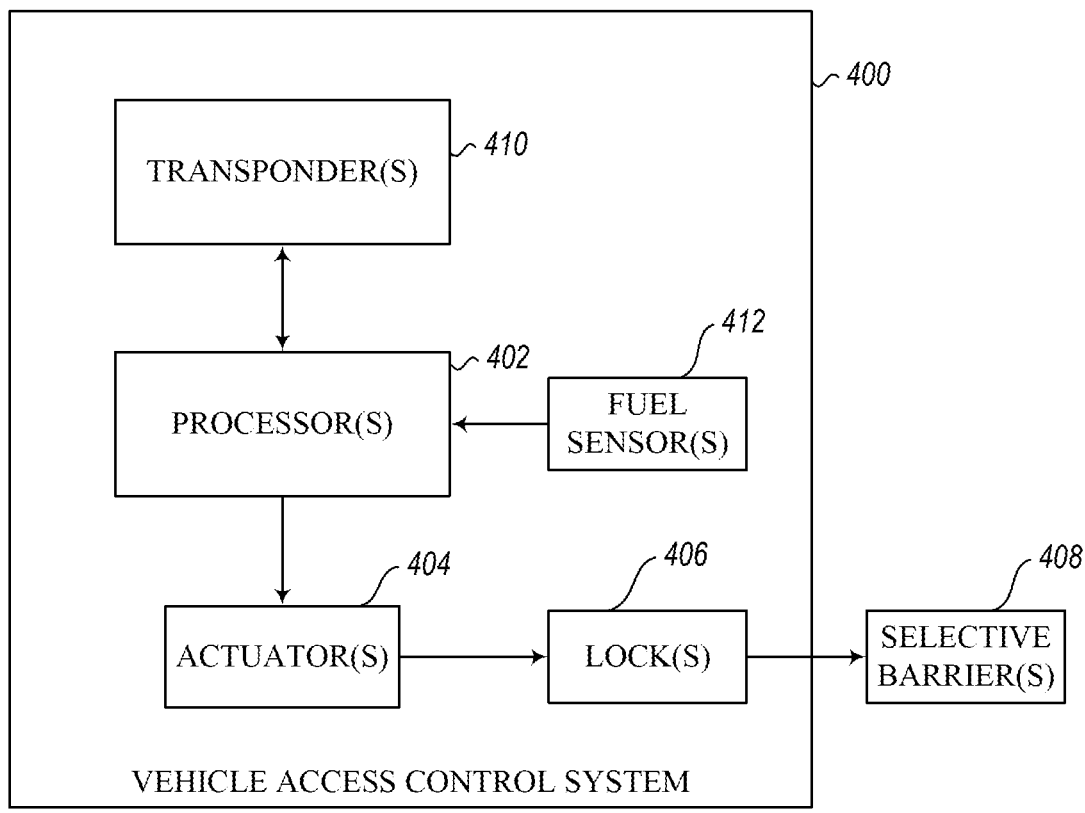
FIG. 4 is a functional block diagram of a vehicle access control system, according to one illustrated implementation.

Referring now to FIG. 4, a vehicle access control system 400 is shown which includes a processor 402 that operates one or more lock actuators 404 coupled to one or more locks

406. The one or more locks 406 control one or more respective selective barriers 408 (e.g., doors) to one or more areas secured by the locks. The processor 402 can activate a wireless transponder 410, which may be a passive or active RFID tag or system. The transponder 410 can instruct an antenna (e.g., an RFID antenna) associated with the transponder to search for RFID devices neighboring the system 400. If the transponder 410 detects an RFID device, the transponder may obtain identifying information of the RFID device and may transmit the information to the processor 402. The processor 402 may also cause the transponder 410 to transmit or broadcast identifier information to the RFID device. The processor 402 can compare received information against the information for RFID devices associated with entities authorized to access an area secured by the vehicle access control system 400, such as a fuel inlet, trunk, or engine compartment. If the processor 402 determines access should be granted, the processor can instruct the one or more actuators 404 to unlock one or more locks 406 that selectively regulate access to one or more respective areas secured by the vehicle access control system 400.

In some implementations, the vehicle access control system 400 may include one or more fuel sensors 412 communicatively coupled to the processor 402. The one or more fuel sensors 412 may provide fuel level information to the processor 402 which may be forwarded to the service provider or may otherwise be used to regulate access to the one or more areas secured by the vehicle access control system 400.

In some implementations, the information for authorized devices and/or people is a list of registered keys or identifiers. In further implementations, the information is a list of serial numbers recorded on RFID devices' tag chips. The identifying information can be stored in a nontransitory memory coupled to at least one of the processor 402 or the transponder 410. If the identifying information the processor 402 receives matches an entry in the list, the processor can determine access should be granted. In response, the processor 402 electrically communicates with the one or more actuators 404, which unlocks the one or more locks 406 to grant access to one or more respective secured areas.

Figure 5:
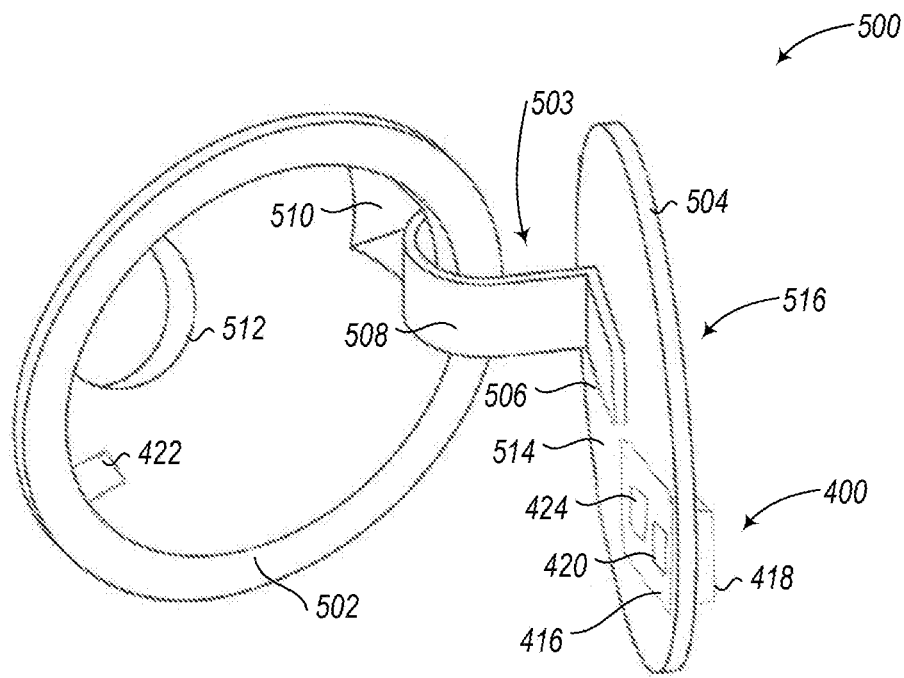
FIG. 5 is a perspective view of a vehicle access control system that is removably attached to a fuel inlet door of a vehicle, according to one illustrated implementation.

FIG. 5 shows an example of the vehicle access control system 400 removably attached to a fuel inlet door assembly 500. The fuel inlet door assembly 500 includes a cavity body 502 and a hinged arm 503, which is supported on the cavity body so as to be capable of being pivoted and on which a fuel filler door 504, which is illustrated herein so as to be open, is fastened. The hinged arm 503 includes coupling section 506, which mounts the fuel filler door 504 as well as an adjacent curved section 508, which projects into a housing extension 510 disposed on the side of the cavity body 502 and which is supported therein so as to be capable of being pivoted about a pivot axis. Provision is made in the rear region of the cavity body 502 for an opening 512, which receives a non-illustrated fuel dispenser neck during refueling.

The vehicle access control system 400 may include a body portion 416 removably coupled to an interior surface 514 of the fuel filler door 504 and retaining portion 418 removably coupled to an exterior surface 516 of the fuel filler door. In some implementations, at least one of the body portion 416 and the retaining portion 418 includes a magnetic component that provides an attractive force between the body portion and the retaining portion so that the vehicle access control system 400 is removably attachable to the fuel filler door 504. In some implementations, the retaining portion 418 includes a visual indicator or marking that signifies to a service provider or to any individual that the vehicle to which the vehicle access control system 400 is attached is to be refueled. Such may also signify to an individual passing by that the fuel filler door 504 has been left unlocked intentionally so that the individual knows not to lock the fuel filler door.

In a region toward the free end of the fuel filler door 504, the body portion 416 includes a first locking component 420. Approximately opposite the first locking component 420, a second locking component 422 is positioned on the cavity body 502. The first locking component 420 may be operatively coupled to a controller and/or actuator 424 disposed in the body portion 416 of the vehicle access control system 400. The first locking component 420 and the second locking component 422 may together form a lock that may be used to selectively regulate access to the opening or fuel inlet 512. The lock may be passive (e.g., one or more magnets) or may be active (e.g., one or more solenoids, mechanical).

Figure 6:
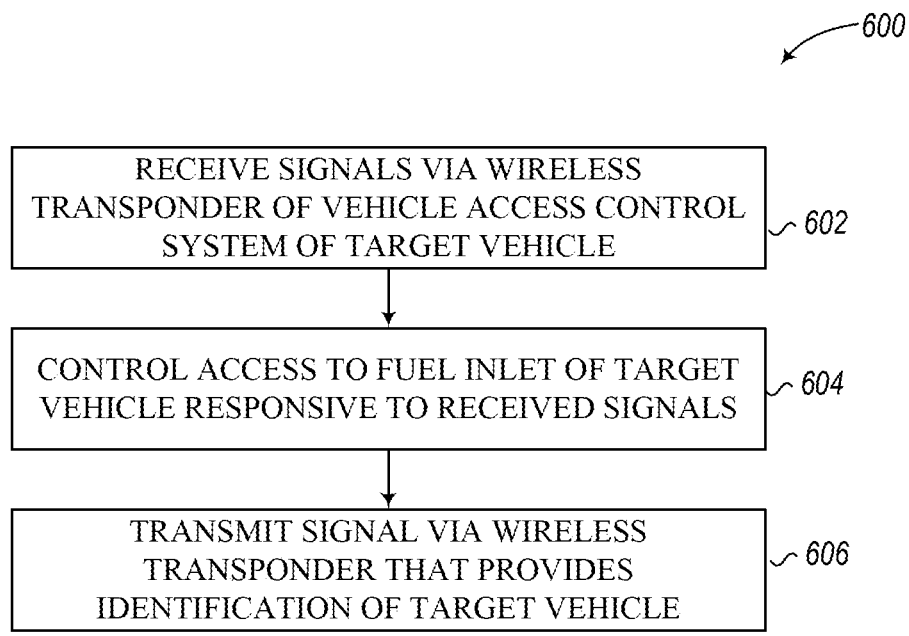
FIG. 6 is a flow diagram showing a method of operation for a vehicle access control system, according to one illustrated implementation.

FIG. 6 shows a high level method 600 of operation for a vehicle access control system, according to one illustrated implementation. The vehicle access control system may include a body coupleable to a vehicle, at least one wireless transponder coupled to the body, at least one nontransitory processor-readable medium that stores at least one of processor-readable data or processor-executable instructions, and at least one processor communicably coupled to the wireless transponder and the at least one nontransitory processor-readable medium.

At 602, the at least one processor may receive signals from the wireless transponder. For example, the at least one processor may receive a wireless key from a mobile device operated by a fuel carrier operator. The at least one processor may determine whether the signals received from the wireless transponder originate from an approved entity, such as a service provider. If so, the at least one processor may control access to a fuel inlet of the vehicle responsive to the received signals from the wireless transponder at 604. For example, the at least one processor may control the operation of a fuel inlet lock to control access to the fuel inlet of the vehicle responsive to the received signals from the wireless transponder. The fuel inlet lock may be a passive lock or an active lock. The fuel inlet lock may selectively restrict movement of at least one of a fuel inlet door of the vehicle or a cap selectively coupleable to the fuel inlet of the vehicle.

At 606, the at least one processor may transmit a signal that provides an identification of the vehicle via the wireless transponder. Such signal may be used by an operator associated with a service provider to determine the location of the vehicle.

In some implementations, the at least one processor may control access to an engine compartment, a trunk, a passenger compartment, or other secured area of the vehicle responsive to the received signals from the wireless transponder. In some implementations, a global positioning system (GPS) receiver or other location determination system may be communicatively coupled to the at least one processor, and the at least one processor may receive GPS data from the GPS receiver, and wirelessly transmit location data via the at least one wireless transponder.

Figure 7:
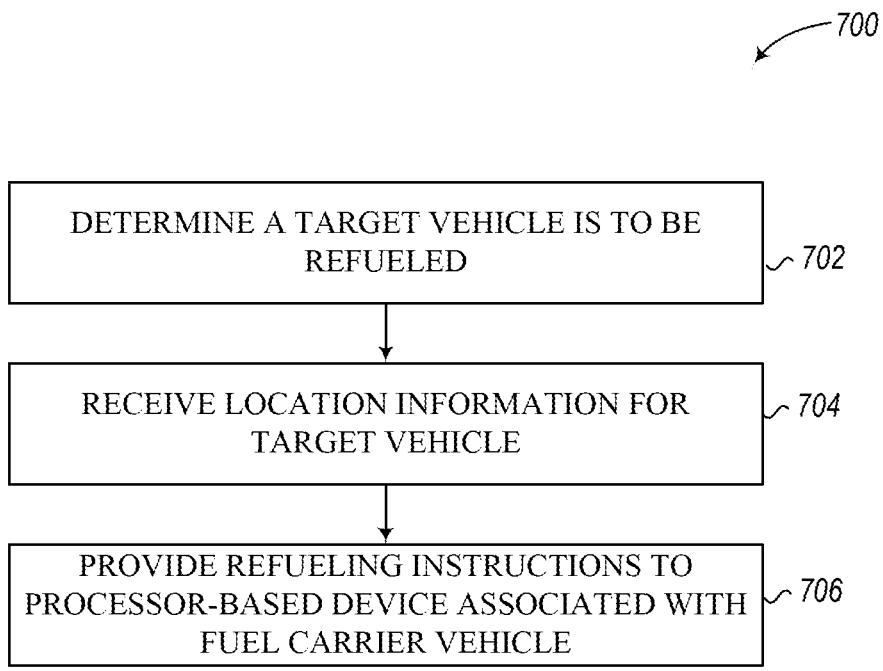
FIG. 7 is a flow diagram showing a method of operation for a fuel delivery system, according to one illustrated implementation.

FIG. 7 shows a high-level method 700 of operation for a fuel delivery system, according to one illustrated implementation. The fuel delivery system may include at least one nontransitory processor-readable medium that stores at least one of processor-readable data or processor-executable instructions, and at least one processor communicably coupled to the at least one nontransitory processor-readable medium and to at least one data communications channel.

At 702, the at least one processor determines a target vehicle is to be refueled. For example, the at least one processor may receive a request for refueling from a processor-based device over the at least one data communications channel. As another example, the at least one processor may determine the target vehicle is to be refueled based on a schedule, based on a projected need of the target vehicle for fuel, or based on a detected need of the target vehicle for fuel.

At 704, the at least one processor receives location information for the target vehicle over the at least one data communications channel. For example, the at least one processor may receive location information from a mobile device associated with the vehicle, or from a user associated with the vehicle that manually inputs location information via a user interface.

At 706, the at least one processor provides refueling instructions to a processor-based device associated with a fuel carrier vehicle, such as a mobile device associated with an operator of a fuel carrier vehicle. The refueling instructions include at least the received location information for the target vehicle. The refueling information may also include fuel type information for the target vehicle, the fuel type information indicative of at least one of a type or grade of fuel to be provided to the target vehicle. The refueling information may also include vehicle identifier information that includes one or more of a make, model, color, year, license number, and location of fuel inlet (e.g., right or left side of vehicle) for the target vehicle.

In some implementations, the at least one processor may receive at least one of location information or route information for a fuel carrier vehicle. In some implementations, the at least one processor may determine that the target vehicle is to be refueled based at least in part on the received location information for the target vehicle and based at least in part on the at least one of location information or route information for the fuel carrier vehicle.

In some implementations, the at least one processor sends a notification to a processor-based device associated with a user of the target vehicle over the at least one data communications channel. The notification may notify the user to provide access to at least one of the fuel inlet or an engine compartment of the target vehicle.

In some implementations, the at least one processor receives an indication that fuel has been delivered to the target vehicle, and sends a message to at least one processor-based device over the data communications channel responsive to the received indication that fuel has been delivered to the target vehicle. The at least one processor may send the message to at least one of a processor-based device associated with a user of the target vehicle or a processor-based device associated with an interested third party (e.g., employer). The message may include, for example, identification of at least one of a quantity of fuel delivered, a type of fuel delivered, one or more services provided, one or more services available to be subsequently provided, or a price.

The processor may send the message to a plurality of different entities over the data communications channel. For example, the at least one processor may send the message to a plurality of different entities that are at least one of responsible for payment of at least a portion of a service provided by the fuel delivery system or responsible for approval of a service provided by the fuel delivery system.

The at least one processor may determines a plurality of target vehicles are to be refueled, and receive location information for each of the plurality of target vehicles over the at least one data communications channel. The at least one processor may generate a route map based at least in part on the received location information, and may provide the generated route map to the processor-based device associated with one or more fuel carrier vehicles. In some implementations, the route map is fully dynamic and/or adaptive.

In some implementations, the at least one processor first receives location information for the target vehicle over the at least one data communications channel that is derived from a first location determination technology (e.g., GPS), and second receives location information for the target vehicle over the at least one data communications channel that is derived from a second location determination technology (e.g., RFID), the second location determination technology different from the first location determination technology.

Implementations of the present disclosure are also directed to a method for mobile refueling, the method comprising: receiving a request to refuel a vehicle of a user, the request comprising: user identification and location information obtained from a mobile device being operated by the user in proximity to the vehicle; the vehicle to be refueled also having an RFID tag associated with the user and to be left unattended with an unlocked or open fuel door; confirming receipt of the request or its acceptance; sending a fuel carrier to a site indicated by the GPS location information and there detecting the RFID tag in order to find the vehicle to be refueled; and dispensing fuel from the carrier to the vehicle, whereby the vehicle is refueled.

Implementations of the present disclosure are also directed to a method for mobile refueling of a vehicle, the method comprising: establishing a service area or planned delivery route for a fuel carrier; receiving a request to refuel the vehicle of a preapproved user, the request comprising: preapproved user identification and location information obtained from a mobile device operated by the user in proximity to the vehicle; the vehicle also optionally bearing an RFID tag associated with the user; adjusting the service area or the planned delivery route of the fuel carrier to include a site indicated by the location information; and optionally confirming receipt of the request and/or its acceptance; sending the fuel carrier to the site and optionally detecting the RFID tag if present to find the vehicle; and dispensing fuel from the fuel carrier to the vehicle, whereby the vehicle is refueled.

Implementations of the present disclosure are also directed to a method for mobile refueling of a vehicle, the method comprising: establishing a service area or planned delivery route for a fuel carrier; receiving a request to refuel the vehicle of a user, the request comprising: user identification and GPS location information obtained from a mobile device operated by the user in proximity to the vehicle; the vehicle also bearing an RFID tag associated with the user; determining that the service area or the planned delivery route of the fuel carrier does not include the site indicated by the GPS location information and will not be adjusted to include the site; sending a reply rejecting the request.

Implementations of the present disclosure are also directed to a method for mobile refueling of vehicles, the method comprising: receiving separate requests from multiple individual requestors to refuel their individual vehicles, each request comprising: requestor identification and GPS location information obtained from a mobile device operated by each requestor in proximity to their individual vehicle;

each of their individual vehicles also bearing an individual RFID tag associated with the individual requestor; adjusting the service area or the planned delivery route of the fuel carrier to include multiple sites indicated by the GPS location information; sending the fuel carrier to the sites and detecting the individual RFID tags to find the individual vehicles at the sites; and dispensing fuel from the fuel carrier to the vehicles, whereby the vehicles are refueled.

Implementations of the present disclosure are also directed to a computer-readable medium tangibly embodying computer-executable instructions configured to cause a processing device to execute operations in support of a mobile motor vehicle refueling service comprising: receiving user refueling request information including user identification and user vehicle identification and location information for multiple users at different locations wherein each location is a preauthorized refueling stop; confirming receipt of the requests and/or or the acceptance or refusal of a request, determining a route for a fuel carrier to go to the different stops for accepted requests, the route being based on the fuel and/or time efficiency of the route, navigation information concerning the accepted refueling stop locations, the time available to complete the route, the determination of the route by the processing device including determining whether to accept or refuse a requestor location as a stop along the route to ensure a cost-efficient route including that the refueling vehicle retains enough supplies of fuel to meet the requests, enough time to complete the route within the available time, and does not exceed a maximum time and/or distance metric per request.

Implementations of the present disclosure are also directed to a system for mobile refueling by fuel carriers of vehicles of approved users at approved mobile refueling locations, comprising: a server connected to a network, the server comprising executable route engineering software; a database accessible by the server, the database comprising approved refueling location information, approved user and user vehicle information, including vehicle identification fuel preference information; a database of public roads and, optionally, regulations regarding movement on public roads of the fuel carrier; and a user computer capable of communication with the server via the network, the user computer being adapted to send refueling request information including user identification and vehicle location information to the server, a fuel carrier computer having a graphical user interface configured to allow updating of route information with real-time information pertaining to user requests and fuel carrier location data which provides a route start point; wherein the route engineering software application is configured to accept the route start point, and utilizing the updated user request information, to calculate travel route options to the users locations, optionally complying with the regulations; wherein the route engineering software application is further configured to compare the calculated travel route options to determine at least one of: which of the calculated travel route options will result in the shortest overall travel time, which of the calculated travel route options will service the most users or deliver the most fuel within a time period, will result in the least total fuel usage by the fuel carrier, which of the calculated travel route options will result in the fewest traffic disruptions for the fuel carrier, and which of the calculated travel route options has the least number of traffic signals; and provide the determined at least one option to the fuel carrier.

Implementations of the present disclosure are also directed to a method of billing for mobile refueling services of personal vehicles provided to authorized users of the service at an authorized common location, comprising: a mobile service provider entity computer receiving from the third party entity computer authorized user information including user personal vehicle identification, user identification, and user contact information for a plurality of users; the mobile service provider entity computer receiving requests from a mobile device operated at the common location by an authorized user for service; the mobile service provider entity computer confirming receipt of the request and instructing the service be provided; the mobile service provider entity computer collecting information on the utilization of the services for each user and/or vehicle and service, including the amount of fuel provided, location of refueling, and the service date; the mobile service provider entity computer apportioning the cost to each user and the third party in accordance with the collected information and with agreements with the third party and each user, and, optionally billing the third party and each user according to the apportioned costs.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

U.S. Provisional Patent Application No. 62/141,703, filed on Apr. 1, 2015, is incorporated herein by reference in its entirety.

What is claimed is:

1. A vehicle access control system, comprising:
a body configured to couple to a vehicle;
at least one wireless radio frequency identification (RFID) transponder coupled to the body;
at least one non-transitory processor-readable medium that stores at least one of processor-readable data including refueling instructions that include i) target vehicle and ii) a fuel type information for target vehicle or processor-executable instructions; and
at least one processor communicably coupled to the wireless RFID transponder and the at least one non-transitory processor-readable medium, where the at least one processor is configured to any of i) use the stored data, ii) process the processor-executable instructions, or iii) a combination of both, to:
receive signals from the wireless RFID transponder; and
cause a visual indication to be provided i) from a visual indicator coupled to a fuel inlet door of the vehicle or ii) from one or more lights of the vehicle responsive to the received signals from the wireless RFID transponder in order to assist in accessing a fuel inlet of the vehicle, via the fuel inlet door.

2. The vehicle access control system of claim 1, further comprising:
a fuel inlet lock that selectively controls access to a fuel inlet, the fuel inlet lock communicatively coupled to the at least one processor, wherein the at least one processor:
controls operation of the fuel inlet lock to control access to the fuel inlet of the vehicle responsive to the received signals from the wireless RFID transponder.

3. The vehicle access control system of claim 2 wherein the fuel inlet lock comprises a passive lock.

4. The vehicle access control system of claim 2 wherein the fuel inlet lock comprises an active lock.

5. The vehicle access control system of claim 2 wherein the fuel inlet lock selectively restricts movement of at least one of the fuel inlet door of the vehicle or a cap selectively configured to couple to the fuel inlet of the vehicle.

6. The vehicle access control system of claim 2 wherein the at least one processor:
determines whether the received signals from the at least one wireless RFID transponder include a wireless key; and
controls access to the fuel inlet of the vehicle responsive to the determination of whether the received signals from the at least one wireless RFID transponder include a wireless key.

7. The vehicle access control system of claim 1 wherein the body is positionable behind the fuel inlet door of the vehicle.

8. The vehicle access control system of claim 1 wherein the body is removably attachable to a portion of the vehicle.

9. The vehicle access control system of claim 1 wherein the at least one processor:
transmits a signal that provides at least one of an identification of the vehicle or an indication of a presence of the vehicle access control system.

10. The vehicle access control system of claim 1 wherein the at least one processor:
controls access to an engine compartment of the vehicle responsive to the received signals from the wireless RFID transponder.

11. The vehicle access control system of claim 1, further comprising:
an engine compartment lock that selectively provides access to the engine compartment, the engine compartment lock communicatively coupled to the at least one processor, wherein the at least one processor:
controls operation of the engine compartment lock to control access to an engine compartment of the vehicle responsive to the received signals from the wireless RFID transponder.

12. The vehicle access control system of claim 11 wherein the engine compartment lock comprises a passive lock.

13. The vehicle access control system of claim 1 wherein the at least one processor:
prevents inadvertent removal of access to the fuel inlet of the vehicle responsive to the received signals from the wireless RFID transponder.

14. The vehicle access control system of claim 1 wherein:
the visual indicator configured to couple to the fuel inlet door of the vehicle visually signals to a request for refueling.

15. The vehicle access control system of claim 1 wherein the at least one wireless RFID transponder comprises a passive RFID transponder.

16. The vehicle access control system of claim 1, further comprising:
a location determination system component communicatively coupled to the at least one processor, wherein the at least one processor:
receives location data from the location determination system component; and
wirelessly transmits location data via the at least one wireless RFID transponder.

17. A method of operation for a vehicle access control system, the vehicle access control system comprising a body coupled to a vehicle, at least one wireless radio frequency identification (RFID) transponder coupled to the body, at least one non-transitory processor-readable medium that stores at least one of processor-readable data including refueling instructions that include i) target vehicle and ii) a fuel type information for target vehicle and processor-executable instructions, and at least one processor communicably coupled to the wireless RFID transponder and the at least one non-transitory processor-readable medium, the method comprising:
receiving, by the at least one processor, signals from the wireless RFID transponder;
causing a visual indication to be provided i) from a visual indicator coupled to a fuel inlet door of the vehicle or ii) from one or more lights of the vehicle responsive to the received signals from the wireless RFID transponder in order to assist in accessing a fuel inlet of the vehicle; and
controlling, by the at least one processor, access to the fuel inlet of the vehicle responsive to the received signals from the wireless transponder.

* * * * *